340-870.11 SR ...SS REFERENCE ...ARCH ROOM
XR 2,783,301
Feb. 26, 1957 W. LYONS 2,783,301
CALL SIGNING
Filed May 4, 1954
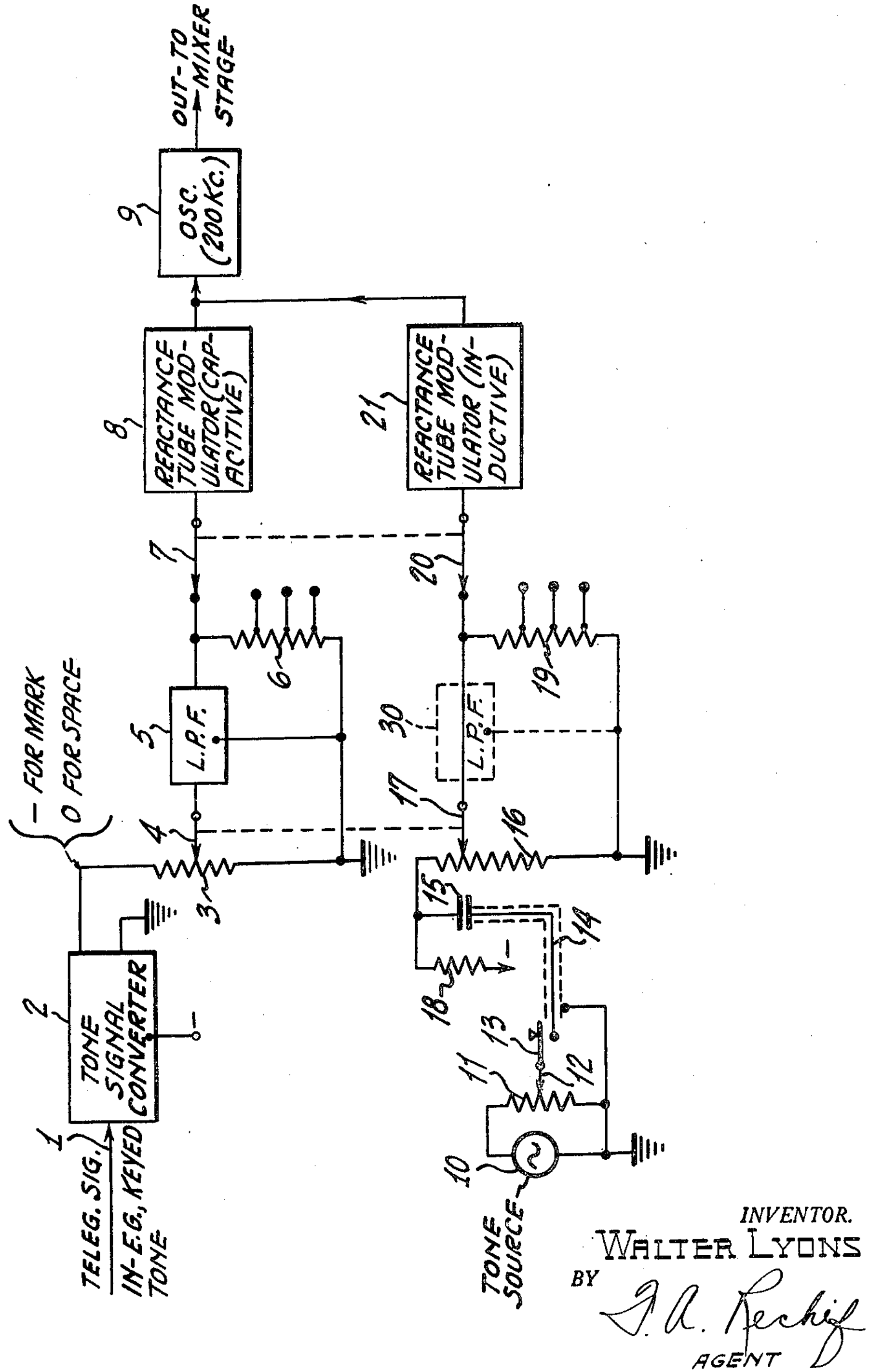
INVENTOR.
WALTER LYONS
BY
G. A. Rechif
AGENT
2783301

United States Patent Office 2,783,301

Patented Feb. 26, 1957

2,783,301

CALL SIGNING

Walter Lyons, Flushing, N. Y., assignor to Radio Corporation of America, a corporation of Delaware Application May 4, 1954, Serial No. 427,519

13 Claims. (Cl. 178—66)

This invention relates to an arrangement for effecting call signing of a radiotelegraph transmitter, and more particularly to an arrangement by means of which call signing may be effected simultaneously with or concomitantly with transmission of telegraphic traffic by the transmitter.

In radiotelegraphy as practiced prior to this invention, call signing (the transmission of a code representing the call letters of the transmitter) had to be done entirely separate and apart from the transmission of telegraphic intelligence, in order to prevent any interference by the call signing with the regular telegraphic traffic. This meant that the regular telegraphic traffic had to be shut down or removed from the transmitter whenever a call sign was to be transmitted. Such a procedure was very expensive for commercial communications transmitters, since such shutdowns resulted in "outages" during which no revenue-producing traffic was handled. To minimize this expense, prior practice dictated that the time-span between call signs be as long as possible. Because the identifications of the transmitter were few and far between, it was very difficult for the receiving operator to determine that the receiver was tuned to the proper transmitter, resulting in great inconvenience and waste of time at the receiver.

An object of this invention is to devise a transmitter keying system by means of which transmitter identification or call-sign signals may be transmitted continuously and simultaneously with regular telegraphic traffic, without any adverse effect upon such traffic.

Another object is to provide a keying system for a frequency shift transmitter by means of which call signing signals may be superimposed upon frequency shift keyed telegraph signals.

A further object is to devise an economical frequency shift transmitter exciter by means of which call signing signals may be superimposed upon frequency shift keying applied to the transmitter.

The objects of this invention are accomplished, briefly, in the following manner: On-off-keyed audio frequency tone, derived from any suitable tone generator keyed by a code keying device, which tone is keyed in accordance with a code representing a call sign, is applied to a reactance tube to frequency modulate an oscillator at a rather small frequency deviation. The mark-space keying voltages which represent telegraphic traffic are concomitantly or simultaneously applied to another reactance tube (preferably of opposite sign to that of the first reactance tube) to shift the frequency of this same oscillator by an amount which is large as compared to the deviation resulting from the first-mentioned frequency modulation. The transmitted wave thus carries two kinds of intelligence.

The foregoing as well as other objects of this invention will be best understood from the following description of an exemplification thereof, reference being had to the accompanying drawing, wherein the single figure is a combined block and schematic diagram of an arrangement according to this invention.

Referring now to the drawing, the telegraph signal input to the transmitter (which may for example be an on-off keyed tone signal, if it is being received at a remotely-located transmitter via land line from a central office) is applied by means of a connection 1 to the input of a tone signal converter 2 which converts the incoming keyed tone to a keyed D. C. output voltage which has a negative value during mark interval and a zero value during space interval. The converter 2 may for example be of the type described and claimed in the copending Volz application, Serial No. 155,233, filed April 11, 1950, Patent No. 2,678,387, dated May 11, 1954, and may include an amplifier, a phase splitter, a full wave rectifier, and a thresholding and limiting circuit. The keyed D. C. output of converter 2 is applied across a potentiometer 3 one end of which is grounded and the movable arm or slider 4 of which is connected to supply input to a low pass filter 5. Thus, the input to filter 5 is the voltage appearing between the arm 4 and ground. Filter 5 removes any undesired or unwanted frequencies and passes the keyed D. C. voltage output of converter 2.

The output of filter 5 is applied across a tapped voltage divider 6 one end of which is grounded. The movable contact 7 of the tap-changing switch associated with divider 6 supplies the selected portion of the voltage across divider 6 to a reactance tube circuit or electronic simulated reactance 8 which is coupled to an oscillator 9 in such a way as to modulate or vary or shift the frequency of this oscillator. Oscillator 9 serves as a source of radio frequency waves. The reactance tube circuit 8 is connected to act as a capacitive reactance across the tuned circuit of oscillator 9 and is of a design well-known to those skilled in the art, so is not illustrated in detail herein. The keyed D. C. output of converter 2 is applied to the reactance tube 8, to shift the frequency of oscillator 9 in accordance with the telegraphic intelligence, this oscillator thus operating at one frequency during mark interval and at a different frequency during space interval. The amount of this frequency shift may be, for example, 600 C. P. S. (cycles per second) from mark to space. In the manner described, telegraphic intelligence is transmitted by the circuit of this invention.

The frequency shifted output of oscillator 9, which may for example vary about a frequency of 200 kc., is applied to an R. F. (radio frequency) mixer stage as indicated, for heterodyning the same to a suitable higher frequency for transmission. With a frequency shift of 600 C. P. S., the output frequency of oscillator 9 may vary between the two discrete values of 199,700 C. P. S. and 200,300 C. P. S., for example.

The output of a low impedance tone source 10, for example an audio frequency generator operating at about 1000 C. P. S., is applied across a potentiometer 11 one end of which is grounded and the movable arm or slider 12 of which is connected to one contact of a telegraph key 13 which, although illustrated as a hand-operated key, may actually be a continuously-motor-driven cam-actuated switch contactor. The other contact of key 13 is connected by means of a shielded cable 14 the shield of which is grounded, to one plate of a coupling capacitor 15. The key or contactor 13 is arranged to produce an on-off keyed tone signal in cable 14, the keying being in accordance with a predetermined code representing the call sign of the particular transmitter the frequency shift exciter for which is illustrated in the figure. This keying takes place at a rather low keying rate, for example 10–12 words per minute. The potentiometer 11 enables adjustment of the amplitude of the tone fed to cable 14 when contactor 13 is closed.

The on-off keyed tone signal (the call sign) is applied to cable 14 continuously, during the entire time of operation of the transmitter, and simultaneously with the application of the telegraphic traffic to the same transmitter in the frequency-shift manner previously described. The keyed tone signal applied to cable 14 is applied through the coupling capacitor 15 across a potentiometer 16 one end of which is grounded and the movable arm or slider 17 of which is ganged on a common shaft with arm 4, as indicated by the dotted-line connection. For a purpose to be later described, an adjustable negative D. C. potential, derived from any suitable source, is applied through a resistor 18 to the ungrounded end of potentiometer 16.

The voltage between arm or slider 17 and ground is applied across a tapped voltage divider 19 one end of which is grounded. The movable contact 20 of the tap-changing switch associated with divider 19 is ganged on a common shaft with contact 7, as indicated by the dotted-line connection, to provide uni-controlled action of both switches. The contact 20 supplies the selected portion of the voltage across divider 19 to a second reactance tube circuit or electronic simulated reactance 21 which is coupled to the oscillator 9 in such a way as to modulate or vary the frequency of said oscillator. The reactance tube circuit 21 is connected to act as an inductive reactance across the tuned circuit of oscillator 9 and is of a design well-known to those skilled in the art, so is not illustrated in detail herein. The keyed tone signal in cable 14 (which, it will be remembered, represents a call sign), which appears at contact 20, is applied to the second reactance tube 21 to produce frequency modulation of the R. F. wave output of oscillator 9. This keyed frequency modulation of oscillator 9 is superimposed on the frequency shift keying of said oscillator in response to telegraphic intelligence, which latter is effected by reactance tube 9 in the manner described previously.

The initial adjustment and operation of this invention will now be described in detail. The frequency shift exciter system described, including all of the apparatus illustrated except the converter 2 and elements 10—13, is of a type which is known in the art. This exciter, which employs bi-directional reactance modulation (the reactance tubes 8 and 21 of opposite signs), is exceptionally suitable for the purpose of the present invention. With zero volts applied both to potentiometer 3 serving the upper, or marking, modulator 8, and to potentiometer 16 serving the lower, or spacing, modulator 21, the output frequency of the oscillator 9 is 200 kc. With zero volts applied to potentiometer 3 but standard negative voltage applied to potentiometer 16 via resistor 18, the slider 17 is adjusted to apply a voltage (between this slider and ground) to divider 19 and thus to reactance tube 21 such that the frequency of oscillator 9 is reduced by one-half of the intended total frequency shift between mark and space, when the contact 20 is on the uppermost tap, corresponding to subsequent multiplication of the output frequency of oscillator 9 by a factor of unity; for example 200 kc.–300 C. P. S.

With the voltage between slider 17 and ground as thus adjusted applied to divider 19 but standard negative voltage (representing mark) applied to potentiometer 3 via the tone signal converter 2, the slider 4 (which is ganged with slider 17) applies a voltage (between slider 4 and ground) to divider 6, via the filter 5, such that the frequency of oscillator 9 is increased by the full amount of the intended total frequency shift between mark and space, when the contact 7 is on the uppermost tap, corresponding to subsequent multiplication of the output frequency of oscillator 9 by a factor of unity; for example 200 kc.+300 C. P. S. In other words, the frequency of oscillator 9 is now raised (by the application of negative voltage to potentiometer 3 and reactance tube 8) from the space frequency, which is 200 kc. minus one-half of the total frequency shift, to the mark frequency, which is 200 kc. plus one-half of the total frequency shift.

The low pass filter 5 between potentiometer 3 and divider 6 controls the rate of change of frequency of oscillator 9 in response to the regular keyed on-off voltage output (negative for mark, zero for space) appearing between arm 4 and ground, both for transitions from space-to-mark and for transitions from mark-to-space, and limits the number of harmonics of the fundamental keying frequency which are included with significant amplitude in the envelope of the transmitted wave.

The reaction on the voltage between slider 17 and ground due to any modulation of the voltage between slider 4 and ground, or vice versa, is negligibly small, due principally to the use of two entirely separate reactance tube circuits 8 and 21 for modulation of the frequency of oscillator 9. Consequently, a second frequency modulation of the exciter output (output of oscillator 9) can be accomplished by amplitude modulation of the voltage between slider 17 and ground, and this is what is done according to this invention in order to superimpose the identification or call signing on the normal frequency shift keying, without interruption or appreciable degradation of the transmission of normal telegraph signals. The aforesaid amplitude modulation of the voltage between slider 17 and ground is effected by the on-off keying of the audio frequency tone source 10 to form the identification signals in the manner previously described. This amplitude modulated tone (on-off-keyed tone) is applied through capacitor 15, etc. to reactance tube circuit 21 in such a manner that when the tone is "on" it produces frequency modulation of the oscillator 9 to a predetermined limited degree in addition to that produced by the regular frequency shift keying. This limited or secondary frequency modulation of the oscillator 9 by the on-off-keyed tone (call sign) is effected concurrently with, concomitantly with, or simultaneously with, the frequency shift of such oscillator due to the regular mark and space telegraphic intelligence.

The amplitude modulation of the voltage between slider 17 and ground (i. e., the tone voltage input to the reactance tube 21) is proportioned to produce a peak-to-peak frequency change (frequency deviation) on the order of 5% of the 600 C. P. S. peak-to-peak frequency shift caused by the regular telegraph keying in the absence of the superimposed tone modulation. Thus, it may be seen that the frequency deviation resulting from the "call-sign" frequency modulation of oscillator 9 is small as compared to the frequency shift of said oscillator produced in response to the mark and space telegraphic intelligence. Also, according to this invention very little of the transmitted energy is utilized to transmit the identification signal, or (to use an expression common in the telegraph art) to QRA. In fact, less than 1 db of power would be removed from the telegraphic traffic signal even if the auxiliary tone of saiy 1000 C. P. S. were to deviate the frequency of the main traffic signal as much as 600 C. P. S., and this regardless of the pattern of keying of the main traffic FSK signal. It may be seen that, because of these characteristics, the call signing of the FSK transmission is accomplished according to this invention without any interference with, or appreciable degradation of, the main transmission.

It may be seen that, according to this invention, the frequency of oscillator 9 is modulated with the on-off-keyed tone (call sign), and the mean frequency of the frequency modulated waves thus produced is shifted a predetermined amount on either side of such mean frequency in response to the mark and space keying voltages for the telegraphic intelligence.

The tapped voltage dividers 6 and 19, and the respective contactors 7 and 20, are provided to allow for different amounts of frequency multiplication in the transmitter proper which follows the frequency shift exciter illustrated in the drawing. As the frequency multiplication factor utilized is changed, the frequency shift of oscillator 9 (and the voltages fed to the reactance tubes 8 and 21) must be changed in the opposite direction, so that the total frequency shift in the final transmitter output will be of the proper value.

Although a frequency shift from mark to space of 600 C. P. S. has been mentioned, this is given only by way of example. Actually, such frequency shift may be anything from around 100 C. P. S. to around 800 C. P. S. A frequency shift which is now in fairly extensive use is 400 C. P. S.

At the remote receiving location, detection of the transmitted identification or QRA signal may be effected by means of a conventional FM receiver (such as a monitor receiver), or by means of a conventional AM receiver, since distortion in the ether will cause the FM signal transmitted to have AM components at a distant reception point. Or, the signal can be received on an AM receiver which is slightly detuned so that the sides of the selectivity curves of the receiver are utilized as a type of discriminator, in the event that the distortion in the ether is too little to allow for normal AM reception.

At the receiver, the received audio frequency tone, after detection, can be used to unlock the receiver automatic frequency control circuit and permit it to operate. This insures effective receiver AFC (automatic frequency control) only when such receiver is properly tuned to a particular transmitter.

It will be observed that any voltage that reaches potentiometer 16, intentionally or accidentally, will be in a position to frequency modulate the oscillator 9. Accordingly, it might be necessary in certain instances to take measures as follows to preclude unwanted modulation. A low pass filter that will pass the fundamental of the tone frequency but severely attenuate its harmonics, may be required in the connection between potentiometer 16 and divider 19, as shown by the dotted line box 30. Also, precautions should be taken to assure that only the intended second modulation voltage (on-off keyed tone signal) reaches potentiometer 16. In addition, where a common tone source 10 is used for supplying on-off keyed tone for modulating two or more frequency shift exciters simultaneously, the effective coupling between any one frequency shift telegraph circuit and the others must be kept very small, to prevent composite secondary modulation of each transmitter. Furthermore, it may be necessary to control the rate of change of tone amplitude between on and off, in order to minimize the number of harmonics of the secondary (call-sign) fundamental keying frequency included with significant amplitude in the envelope of the transmitted wave.

Many existing frequency shift exciters, in contrast to that illustrated and described, have only one reactance tube modulator, and these automatically generate the space frequency in the absence of modulation to marking. In these exciters it is very difficult to apply the secondary modulation (call signing) in such a manner that intercoupling of primary modulations (telegraphic intelligence) via the secondary modulation circuits (in cases where a common tone source is used for supplying on-off keyed tone to two or more frequency shift exciters concurrently) is held to negligibly low levels. Therefore, instead of using one low pass filter such as 5 to deal with both the primary and secondary modulations, it could be more practical to alter the modulator circuits of the frequency shift exciters to include a spacing modulator such as 21, or a serviceable equivalent thereof.

The width of the spectrum occupied by the highly complex frequency modulation of this invention (involving the combination of normal frequency shift telegraphy and superimposed frequency modulation by an on-off keyed audio frequency tone) is only slightly greater than that occupied by a normal frequency shift telegraph signal alone.

What is claimed is:

1. In a frequency shift telegraph transmitter, a source of radio frequency waves, a source of audio frequency signals, means for keying said last-named source on and off in accordance with intelligence to produce on-off keyed audio frequency signals, means for modulating the frequency of said waves with said keyed signals, a keying circuit for producing mark and space keying voltages in response to telegraphic intelligence, and means for causing the mean frequency of said frequency modulated waves to shift a predetermined amount on either side of said mean frequency in response to said mark and space voltages.

2. In a frequency shift telegraph transmitter, a source of radio frequency waves, means for shifting the frequency of said waves in response to keying voltages representing mark and space telegraphic intelligence, means for producing an on-off keyed tone signal representing a call sign, and means for simultaneously modulating the frequency of said waves with said keyed tone signal.

3. In a frequency shift telegraph transmitter, a source of radio frequency waves, means for shifting the frequency of said waves in response to keying voltages representing mark and space telegraphic intelligence, means for producing an on-off keyed tone signal representing a call sign, a reactance tube circuit coupled to said source for modulating the frequency of said waves, and means for applying said keyed tone signal to the input of said tube circuit.

4. In a frequency shift telegraph transmitter, a source of radio frequency waves, a capacitive reactance tube circuit coupled to said source for shifting the frequency of said waves, means for applying keying voltages representing mark and space telegraphic intelligence to the input of said tube circuit, means for producing an on-off keyed tone signal representing a call sign, an inductive reactance tube circuit coupled to said source for modulating the frequency of said waves, and means for applying said keyed tone signal to the input of said last-named tube circuit.

5. In a frequency shift telegraph transmitter, a source of radio frequency waves, means for shifting the frequency of said source in response to mark and space telegraphic intelligence, a reactance tube circuit coupled to said source for effecting frequency modulation thereof concurrently with the frequency shift thereof, and means for supplying a keyed call-sign signal to the reactance tube input.

6. In a frequency shift telegraph transmitter, a source of radio frequency waves, a reactance tube circuit coupled to said source for shifting the frequency thereof, means for supplying a keyed voltage representing mark and space telegraphic intelligence to the reactance tube input, another reactance tube circuit coupled to said source for effecting frequency modulation thereof concurrently with the frequency shift thereof, and means for supplying a keyed call-sign signal to the input of said other reactance tube.

7. In a frequency shift telegraph transmitter, a source of radio frequency waves, a reactance tube circuit coupled to said source for shifting the frequency thereof, means for supplying a keyed voltage representing mark and space telegraphic intelligence to the reactance tube input, another reactance tube circuit coupled to said source for effecting frequency modulation thereof concurrently with the frequency shift thereof, said reactance tube circuits being constructed and arranged to provide reactances of opposite signs, and means for supplying a keyed call-sign signal to the input of said other reactance tube.

8. In a frequency shift telegraph transmitter, a source of radio frequency waves, a reactance tube circuit coupled to said source for shifting the frequency thereof, means for supplying a keyed voltage representing mark and space telegraphic intelligence to the reactance tube input, another reactance tube circuit coupled to said source for effecting frequency modulation thereof concurrently with the frequency shift thereof, said reactance tube circuits being constructed and arranged to provide reactances of opposite signs, and means for supplying a keyed call-sign signal to the input of said other reactance tube, the frequency shift produced in response to the mark and space intelligence being large as compared to the deviation produced in response to the call-sign signal.

9. In a frequency shift telegraph transmitter, a source of radio frequency waves, a source of audio frequency signals, means for keying said last-named source on and off in accordance with intelligence to produce on-off keyed audio frequency signals, a reactance tube circuit coupled to said source of waves for effecting frequency modulation thereof, means for supplying said keyed audio frequency signals to the reactance tube input, a keying circuit for producing mark and space keying voltages in response to telegraphic intelligence, and means for causing the mean frequency of said frequency modulated waves to shift a predetermined amount either side of said mean frequency in response to said mark and space voltages.

10. In a frequency shift telegraph transmitter, a source of radio frequency waves, a source of audio frequency signals, means for keying said last-named source on and off in accordance with intelligence to produce on-off keyed audio frequency signals, means for modulating the frequency of said waves with said keyed signals, a keying circuit for producing mark and space keying voltages in response to telegraphic intelligence, a reactance tube circuit coupled to said source of waves for causing the mean frequency of said frequency modulated waves to shift a predetermined amount on either side of said mean frequency, and means for applying said mark and space voltages to the reactance tube input.

11. In a frequency shift telegraph transmitter, a source of radio frequency waves, a source of audio frequency signals, means for keying said last-named source on and off in accordance with intelligence to produce on-off keyed audio frequency signals, a reactance tube circuit coupled to said source of waves for effecting frequency modulation thereof, means for supplying said keyed audio frequency signals to the reactance tube input, a keying circuit for producing mark and space keying voltages in response to telegraphic intelligence, another reactance tube circuit coupled to said source of waves for causing the mean frequency of said frequency modulated waves to shift a predetermined amount on either side of said mean frequency, and means for applying said mark and space voltages to the input of said other reactance tube.

12. In a frequency shift telegraph transmitter, a source of radio frequency waves, a source of audio frequency signals, means for keying said last-named source on and off in accordance with intelligence to produce on-off keyed audio frequency signals, a reactance tube circuit coupled to said source of waves for effecting frequency modulation thereof, means for supplying said keyed audio frequency signals to the reactance tube input, a keying circuit for producing mark and space keying voltages in response to telegraphic intelligence, another reactance tube circuit coupled to said source of waves for causing the mean frequency of said frequency modulated waves to shift a predetermined amount on either side of said mean frequency, and means for applying said mark and space voltages to the input of said other reactance tube, the frequency shift produced in response to the mark and space voltages being large as compared to the deviation produced in response to the keyed audio frequency signals.

13. In a frequency shift telegraph transmitter, a source of radio frequency waves, a source of audio frequency signals, means for keying said last-named source on and off in accordance with intelligence to produce on-off keyed audio frequency signals, a reactance tube circuit coupled to said source of waves for effecting frequency modulation thereof, means for supplying said keyed audio frequency signals to the reactance tube input, a keying circuit for producing mark and space keying voltages in response to telegraphic intelligence, another reactance tube circuit coupled to said source of waves for causing the mean frequency of said frequency modulated waves to shift a predetermined amount on either side of said mean frequency, said reactance tube circuits being constructed and arranged to provide reactances of opposite signs, and means for applying said mark and space voltages to the input of said other reactance tube.

References Cited in the file of this patent

UNITED STATES PATENTS

| | | |
|---|---|---|
| 2,456,992 | Pugsley | Dec. 21, 1948 |
| 2,676,314 | Wallace | Apr. 20, 1954 |
| 2,675,540 | Schultheis | Apr. 13, 1954 |